United States Patent [19]

Takasugi

[11] 3,764,981

[45] Oct. 9, 1973

[54] SYSTEM FOR TRANSMITTING 1-BIT INFORMATION HAVING PRIORITY LEVEL

[75] Inventor: Kazuo Takasugi, Higashiyamato, Japan

[73] Assignee: Hitachi, Ltd., Tokyo, Japan

[22] Filed: Nov. 9, 1971

[21] Appl. No.: 196,991

[30] Foreign Application Priority Data

Nov. 9, 1970 Japan .............................. 45/97911

[52] U.S. Cl. .......................... 340/147 LP, 340/172

[51] Int. Cl. .............................................. H04q 9/00

[58] Field of Search .......... 340/147 R, 152, 147 LP, 340/172; 179/15 AL

[56] References Cited

UNITED STATES PATENTS

| | | | |
|---|---|---|---|
| 3,632,881 | 1/1972 | Graham | 179/15 AL |
| 3,639,904 | 2/1972 | Arulpragasam | 340/147 |
| 3,659,271 | 4/1972 | Collins | 179/15 AL |
| 3,665,398 | 5/1972 | Kawai | 340/147 |

*Primary Examiner*—Donald J. Yusko
*Attorney*—Craig, Antonelli & Hill

[57] ABSTRACT

In a system comprising a central control room connected at one end of a bus, and a plurality of stations coupled to optional positions along the bus, whereby request signals from the respective stations are transmitted to the control room in the order of the height of the priority levels of the stations, an information transmission system is included wherein the stations are classified into $l$ sets every $m$ ones in the order of the height of the priority levels, while a time width in which the request signal is transmitted from each station to the bus is divided into two parts $^{P}1$ and $^{P}2$ continuous in time, so that level signals indicating the sets which are making request for starting may be transmitted every set of the $m$ stations at the part $^{P}1$, and that each station may transmit an order signal at the timing of $^{P}2$ only when the level signal higher in priority than the set to which it belongs is not transmitted to the bus.

15 Claims, 12 Drawing Figures

INVENTOR
KAZUO TAKAGUSI
BY Craig, Antonelli & Hill
ATTORNEYS

INVENTOR

KAZUO TAKASUGI

BY Craig, Antonelli & Hill
ATTORNEY

SYSTEM FOR TRANSMITTING 1-BIT INFORMATION HAVING PRIORITY LEVEL

BACKGROUND OF THE INVENTION

The present invention relates to a system for transmitting to a central control room, information from a number of stations coupled to a bus, particularly such information usually being of 1 bit as an interrupt signal, request signal and the like.

In a process control, where a plurality of stations are coupled to a bus and are subject to the centralized control by an electronic computer in the central control room or sector, or in an automated control system in an institute or hospital, where all the computers used in the respective laboratories, medical offices, etc. are coupled to a common bus and are controlled by a main computer in the control room, each station coupled to the bus supplies an interrupt signal or request signal to the control room when it makes the computer in the control room a request for a task or when it requests permission of the use of the bus in order to carry out exchange of information between the stations. In the control room, it is necessary to examine from which stations such signals are generated and to discriminate the priority levels of the stations themselves. The system of the present invention is mainly applied to such use.

DESCRIPTION OF THE PRIOR ART

As a system applied to such use, there has recently been suggested a type as discussed below.

A level signal of 1 bit, indicating that a station coupled to the bus has a request for interruption, is fed to the control room. Upon reception of the signal, the electronic computer transmits to the bus a signal for examining the address of the station requesting the interruption among a number of stations. As an answer thereto, an order signal is fed as an input to the computer.

Although such a system has a number of advantages over various systems having heretofore been used in practice, it requires two steps of transmission of the level signal and the order signal, and becomes complicated to that extent. Accordingly, it has not yet been satisfactorily placed into practical use.

SUMMARY OF THE INVENTION

In view of such disadvantages of the prior art, the present invention has its main object in carrying out the above-mentioned signal transmission in one step, so as to further simplify the system.

In order to accomplish this object, the present invention divides $l \times m$ signal sources, coupled to the bus, into $l$ sets, every $m$ ones in the order of the height of the priority levels, and assigns matrix type addresses such as **11, 12, 13, .....1*m*, 21, 22, .......2m .....*l m*. The first characterizing feature of the invention resides in that, as means to inform the central control room of the address of the signal source which is making request for starting, information respectively indicating a number in 1 to $l$ and a number in 1 to $m$ are transmitted from the station to the bus in separate time bands. More specifically, a time width T necessary to transmit the information is divided into two portions $^P1$ and $^P2$. The information indicating to which number of 1 to $l$ the signal source making the request belongs is transmitted during the portion $^P1$, while the information indicating to which number of 1 to $m$ said signal source belongs is transmitted during the portion $^P$ 2**. For the section between $^P1$ and $^P2$, there are inserted pulses S and E of magnitudes and polarities with which they may be distinguished from clock pulses. The information during the portions $^P1$ and $^P2$ may be represented by the positions of pulses to-be-transmitted. If, for example, $^P1$ is selected at a time width corresponding to $l$ clock pulses and $^P2$ is selected at a time width corresponding to $m$ clock pulses, then the address of the signal source may be discriminated the relationship of the clock signals as counted from the pulse S and the pulse E with which the positions of the transmission pulse are synchronized.

The second feature of the present invention resides in that the station coupled to each signal source detects whether or not there is a signal of a priority level higher than that of its own among signals $^P1$, and that in case where such signal is present, it prohibits the transmission of the signal from its signal source during the period of time of $^P2$.

Thus, during the time frame $^P2$, only the signal belonging to the set of the highest priority level in the sets 1 to $l$ is transmitted to the bus. Accordingly, the address of the signal source of the highest priority level among those which are making request for starting may be known from the position of the pulse nearest to S in the time width or frame $^P1$ and the position of the pulse during $^P2$.

Other objects, features and advantages of the present invention will be apparent from the following detailed description when read in conjunction with the accompanying drawings.

BRIEF DESCRIPTION OF THE DRAWINGS

FIGS. **5*a*–5*g* are a time chart for explaining the operation of the embodiment.

PREFERRED EMBODIMENTS OF THE INVENTION

Figure 1:
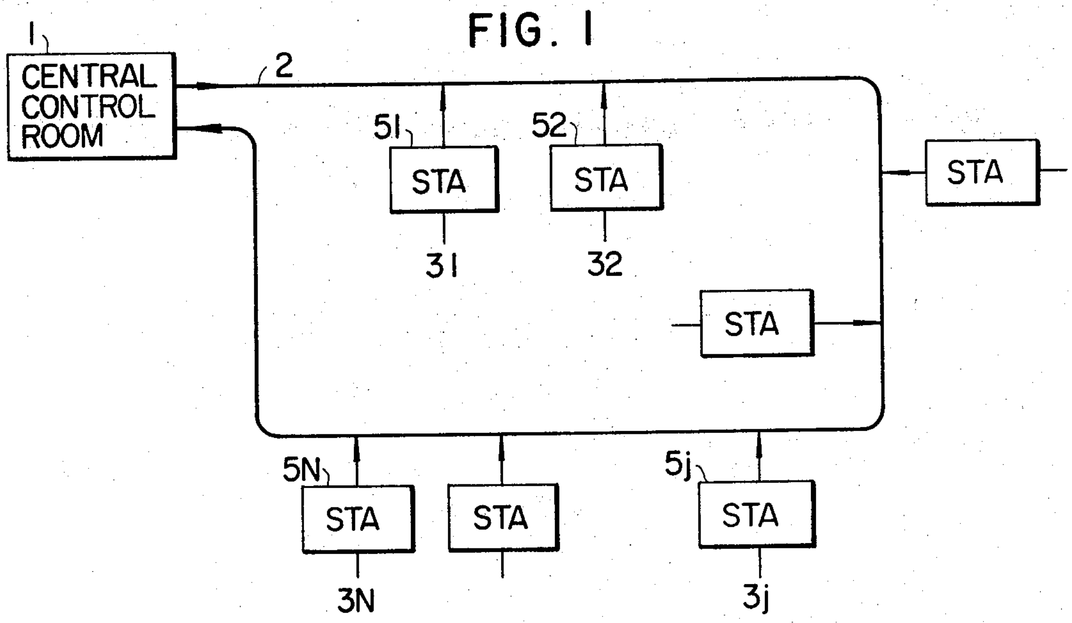
FIG. 1 is a block diagram for explaining the fundamental principle of the present invention.

FIG. 1 shows a system in the case where a number of stations coupled to a bus are subject to the centralized control. In the figure, numeral 1 designates a central control room including a computer, 2 the bus, 31, 32 .... 3N signal sources of starting requests which are fed to the control room, and 51, 52.....5N the stations respectively coupled to the bus. The number of the signal sources is $l \times m$ as previously stated, and they are assumed to be classified into $m$ sets of $l$ sources in the order of the level of priority.

Figure 3:
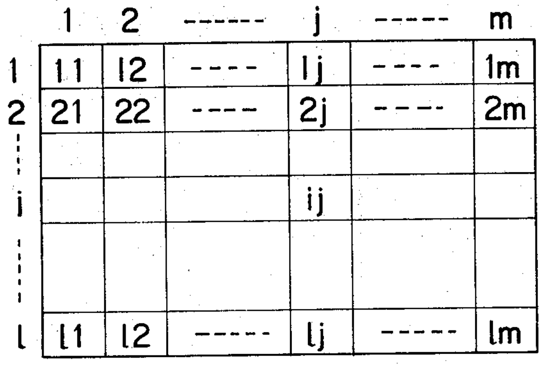
FIG. 3 is a diagram for explaining the priority levels of the request signals.

The classification is illustrated in FIG. 3. For example, the signal sources of priority level 1 are assigned with addresses among 11 to **1*m***. The signal sources of priority level $i$ are assigned with addresses among $il$ to $im$. At the same priority level, the request signal source concerned with a task of higher importance has an address of smaller numerical value.

Figure 2:
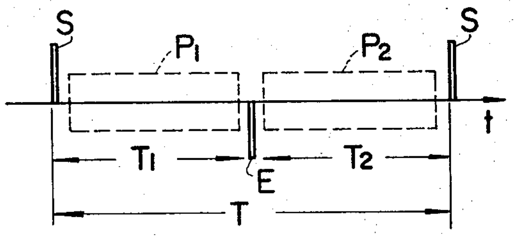
FIG. 2 is a diagram for explaining the timing of the transmission of request signals.

With the system of the present invention, the set 11 to *lm* of the highest priority in the stations or apparatus assigned with the addresses 11 to *lm* in FIG. 3 transmits the request signal in synchronism with a clock next to a discriminating pulse S as shown in FIG. 2, when there is one making a request for starting in the set. The set *il* to *im* of the *i*-th priority transmits the request signal in synchronism with the i-th clock from the pulse S. During time period $^{P}2$, a group or set of the highest priority of those presently making request for starting, e.g., the set *i* in case where the sets *i* and *l* are making the requests, is selected. Thus, the request signal of the station in the set *il* to *im*, as is making request for starting, for example, of *ij*, is transmitted to a data line of the bus 2 in synchronism with the *j*-th clock from a discriminating pulse E.

Description will now be made of a practical embodiment of the present invention.

Figure 6:
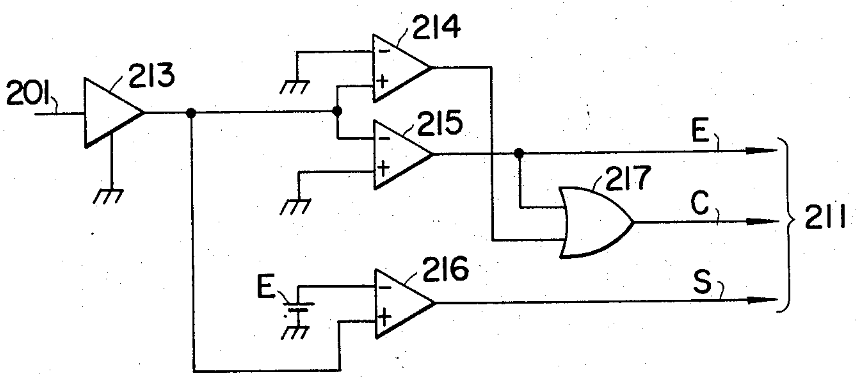
FIG. 6** is a block diagram of an address receiver of the embodiment.
Figure 4:
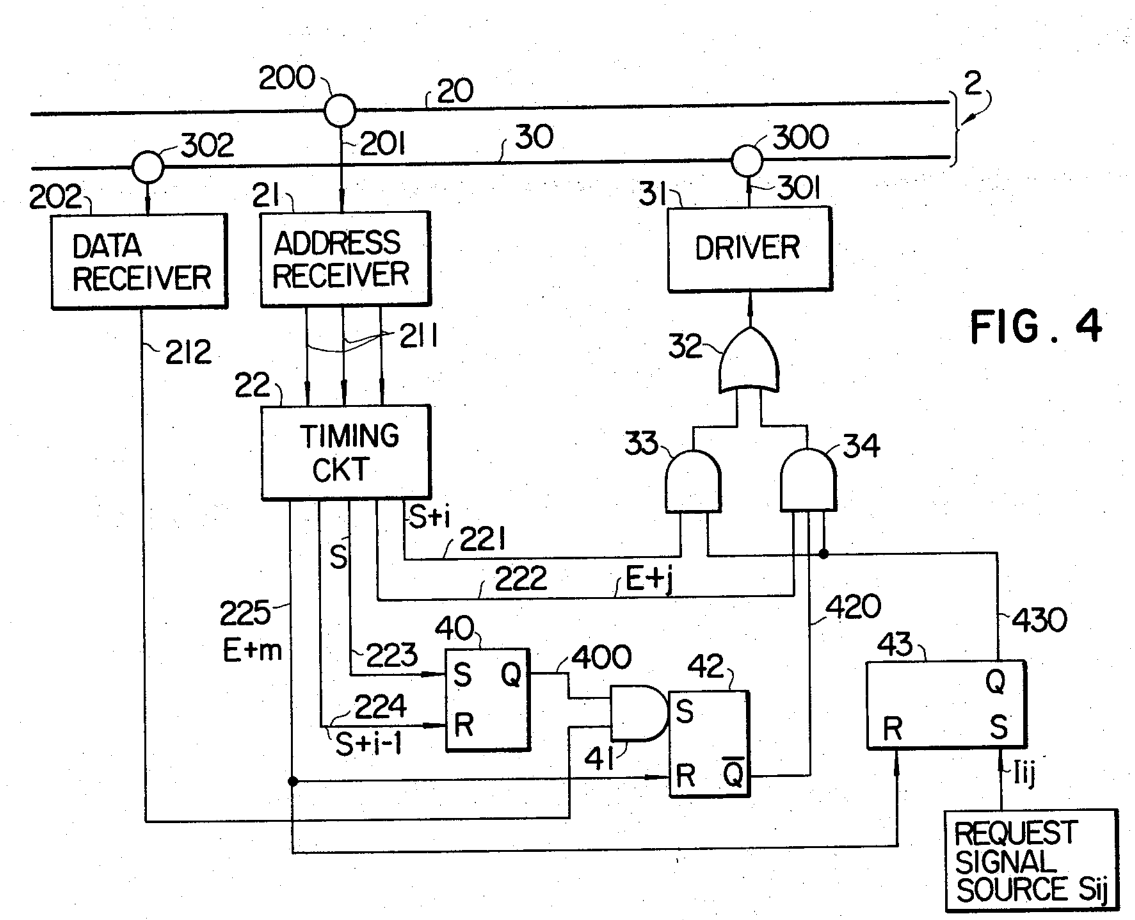
FIG. 4 is a block diagram for explaining an embodiment of the essential portions of the system of the present invention.
Figures 5A, 5B, 5C, 5D, 5E, 5F, 5G:
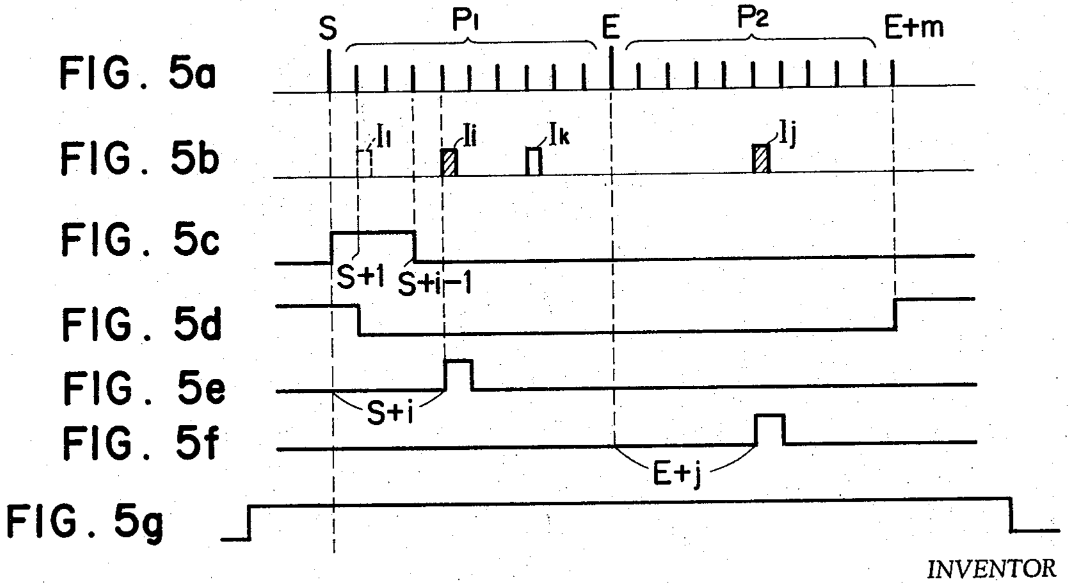

FIG. 4 is a block diagram which shows the construction of a station coupled to the bus. In the figure, the bus 2 consists of an address line 20 and a data line 30. A train of pulses as shown in FIG. 5*a* are transmitted to an address line 20 from the central control room as hereinafter stated. The train of pulses comprise clock pulses, and the discriminating pulses S and E for discriminating the time width portions $^{P}1$ and $^{P}2$ referred to above. The train of pulses of the address line 20 are taken into an address receiver 21 through a coupling unit 200. The address receiver 21 is a device for separating the clock C, start pulse S and end pulse E from among the above train of pulses, to output the separated pulses to output lines 211. An example of the construction of the address register is shown in FIG. 6.

The pulse train from a line 201 is amplified by an amplifier 213, whereupon it enters comparators 214 to 216. The comparator 214 provides an output only when a pulse higher than the zero level is received, while the comparator 215 produces an output only when a pulse lower than the zero level is received. The comparator 216 generates an output only when a pulse of a level higher than that of the clock is received. As a result, the outputs of the comparators 215 and 216 become pulses of the same timing as that of the end pulse E and that of the start pulse S, respectively, while an output of an OR gate 217 of the OR logic between the outputs of the comparators 214 and 215 becomes a pulse train of the same interval as that of the clock. The pulses are fed through the lines 211 into a timing circuit 22, shown in FIG. 4. The circuit 22 serves to take out a timing pulse necessary to examine whether or not there is a starting request higher in the priority than a starting request pulse *Iij* of the particular station in the time period $^{P}1$.

More specifically, when the priority level of the signal *Iij* is indicated by (*i, j*) as shown in FIG. 3, the i-th pulse S + *i* as counted from the start pulse S is taken out from an output line 221, and it is supplied to an AND gate 33. From an output line 222, the *j*-th pulse E + *j* from the end pulse E is taken out, and it is supplied to AND gate 34. A pulse of the same timing as that of the start pulse S is taken out from an output line 223 while the (*i*-1) -th clock S + *i* - 1 from the start pulse S is taken out from an output line 224, and they are respectively impressed upon a set terminal S and a reset terminal R of a flip-flop 40. Further, the *m*-th pulse E + m from the pulse E is taken out from an output line 225, and is fed to reset terminals of flip-flops 42 and 43.

The timing circuit comprises a shift register of *i* bits and a shift register of *m* bits. The pulse S enters the register of *i* bits, and outputs of the (*i* - 1) -th bit and the *i*-th bit are taken out. The pulse E enters the m-bit shift register, and the pulse E + *j* and the pulse E + m are respectively taken out from the *j*-th bit and the *m*-th bit. The shift of the contents of the respective registers is carried out by the clock from the line 211. Such a circuit may be realized very easily by one skilled in the art and so a detailed description thereof is omitted here.

The AND gate 33 is controlled so that a request signal $I_i$ may be transmitted to the data line 30 of the bus at the timing of the i-th clock from the pulse S in the time band $^{P}1$, while the AND gate 34 is controlled so that the request signal $I_j$ may be transmitted at the timing of the *j*-th clock from the pulse E. The output of the flip-flop 40 is shown in FIG. **5*c*. The signal is applied to and AND gate 41 through an output line 400.**

On the other hand, signals of the data line 30, e.g., request signals $I_1$ and $I_k$ provided from other stations are illustrated in FIG. **5*b*, are applied to the AND gate 41 through a coupler 302 and a data receiver 202. The gate provides an output when both the inputs coincide, with the result that the flip-flop 42 set by the output is set only when the request pulse is present within the period of time shown in FIG. 5*c*. That is to say, the gate 41 and the flip-flop 42** serve to judge whether or not a starting request higher in the priority level than the request signal $I_{ij}$ is being produced from another station.

The flip-flop 42 is reset by the pulse from the output line 225 of the timing circuit 22, namely, the m-th pulse E + *m* as counted from the end pulse E. When the flip-flop 42 is set, the gate 34 is closed, whereas when it is reset, the gate 34 is opened. That is to say, when a pulse higher in the priority level than the request signal $I_{ij}$ of the particular station has been transmitted from another station to the data line, the gate 34 is closed to stop the transmission of the signal $I_{ij}$. The outputs of the gates 33 and 34 are transmitted to the data line 30 through an OR gate 32, a driver 31 and a coupler 300.

The request signal $I_{ij}$ from a request source $S_{ij}$ enters a set terminal of the flip-flop 43, and sets it to indicate a state in which an interruption request is being produced. The flip-flop 43 is reset by the pulse E + *m* from the timing circuit 22, as referred to above.

Now consider a case where a starting request is produced from the request source $S_{ij}$ having the priority level (*i–j*) as shown in FIG. 3, and where no starting request is provided from another source having a priority level higher than the above one.

In this case, the gate 33 is opened by a signal from an output line 430 of the flip-flop 43, the pulse S + *i* from the output of the 221 passes through the gate 33, and it is fed through the gate 32 into the driver 31. Thus, the driver 31 transmits a pulse, as shown in FIG. **5*e*, to the data line 30** at the timing of S + *i* of the clock.

On the other hand, an output is provided from the flip-flop 40 during the (*i*–1)-th pulse S + *i* – 1 from the start pulse S, and it enters the AND gate 41. Since, however, there is no output signal from the data receiver 202, the output of the gate 41 is zero. Accordingly, the flip-flop 42 is in the reset state, and its output is supplied to the AND gate 34.

As a result, the pulse E $+j$ from the timing circuit 22 passes through the gate 34, and a signal shown in FIG. 5*f* is transmitted through the driver 31.

In contrast, if a signal higher in the priority level than the request signal $I_{ij}$, e.g., the signal $I_1$ in FIG. 5*b*, is transmitted from another station to the date line 30, the transmitted pulse is fed into the flip-flop 42 through the data receiver 202, a line 212 and the gate 41, and sets the flip-flop 42. Since the gate 34 is accordingly closed by the output of the flip-flop 42, the transmission of the pulse $I_j$ at the timing of E $+j$ as shown in FIG. 5b is prevented.

As described above, according to the system of the present invention, while all the request signals of stations making request for starting are transmitted to the bus in the time section $^P1$, it is only the signal from a station of the highest priority level that is transmitted in the time section $^P2$ and the transmission of the signals from other stations is prevented.

Herein, signals of the time band $^P1$ are called "level signals," and signals of the time band $^P2$ are called "order signals."

In the central control room, the address of a signal making request for starting may be judged from one of the highest priority level among level signals of the time band $^P1$ as are delivered through the bus, i.e., a pulse nearest from the start pulse S, and from time intervals of order signals of the time band $^P2$ respectively from the pulses S and E. Accordingly, necessary processing may be carried out in the central control room in correspondence with the request signal $I_{ij}$.

According to the signal transmitting system as explained above, a signal of one of the highest priority level among stations making request for starting may be supplied to the control room by one step of transmission so that the address of the station may be discriminated. Therefore, the system becomes remarkably simple.

In the foregoing system, it is also possible to prevent the signal transmission from all the stations to the bus in response to a signal from the central control room.

To this end, a pulse may be transmitted from the control room to the data line 30 at the same timing as that of a clock nearest to the start pulse S. Since the pulse for prevention is equivalent to a request signal of the highermost priority level, the stations coupled to the bus may not transmit order signals of the time band $^P2$. Similarly, it is also easy to control the system so that the transmission of request signals below a predetermined priority level may be prevented. Such functions are very effective in the control of the system.

I claim:

1. A system having a central control sector, a number of stations each including a 1-bit information source having a priority level, and means to couple said central control sector and said stations with a bus which consists of an address line for transmitting from said control sector to said respective stations a pulse train with clock signals of a fixed time interval included between reoccurrence pulses including a start pulse S and an end pulse E, and a data line for transmitting 1-bit information from said respective stations to said control sector, whereby the 1-bit information of the information source being the highest in the priority level in the information sources making request for communication is transmitted to said central control sector, wherein said each station comprises:

a. a 1-bit information source $S_{ij}$ which, for $l \times m$ information sources (where $l$ and m are arbitrary numbers) divided into $l$ groups every $m$ ones in the order of the height of the priority levels, has a priority level $i$ among those of 1 to $m$ and a priority level $j$ among those of 1 to $l$, b. first storage means which is set when transmission of said 1-bit information of said information source is requested, c. an address received for receiving said pulse train of said address line thereinto, d. a data receiver for receiving the pulse of said data line thereinto, e. a timing circuit for taking out from outputs of said address receiver said start pulse S, the respectively $i$-th and ($i-1$) -th clocks $(S + i)$ and $(S + i - 1)$ from said start pulse S, and the $j$-th clock $(E + j)$ from said end pulse $E$, f. first gate means for taking the logical AND product of an output of said first storage means and the pulse $(S + i)$, g. means for discriminating if a pulse is fed into said data receiver during a period between the pulses $S$ and $(S + i - 1)$, h. second gate means for taking the logical AND product of an output of the discriminating means, the pulse $(E+j)$, and an output of said first storage means, and i. a driver for transmitting to said data line the output of an OR logic means connected to the outputs of the first and second gate means.

2. A system according to claim 1, wherein said timing circuit further comprises means for generating the $m$-th pulse $(E + m)$ from said end pulse $E$, and wherein the contents of said first storage means are reset by said pulse $(E + m)$.

3. A system according to claim 1, wherein said discriminating means comprises a first flip-flop which is set by said pulse $S$ and which is reset by said pulse $(S + i - 1)$, AND gate means for taking the logical AND product of the output of said first flip-flop and an output of said data receiver, and a second flip-flop which is set by an output of said AND gate means and which is reset by said pulse $(E + m)$ from said timing circuit.

4. A system for transmitting 1-bit information having priority levels, comprising:

1. a central control sector
2. a bus disposed so as to be led out from said central control sector and to form a loop to be again returned to said central control sector, and
3. local stations arranged along said loop of said bus and respectively coupled to said bus, I. said bus including an address line for transmitting a pulse train which consists of start pulses S repeated at a fixed period, end pulses E each being inserted between the adjacent pulses S and clock pulses C of a fixed interval inserted between both said pulses S and E, and a data line for transmitting 1-bit request pulses corresponding to said respective local stations, II. said respective local stations having priority levels different from one another, said levels being prescribed by a group priority address $i$ (level signal) representative of priorities of 1 to an arbitrary integer $l$ and an individual priority address $j$ (order signal) representative of priorities of 1 to an arbitrary integer $m$, and said each local station comprisng:

a. means to transmit to said data line a group priority-level discriminating pulse (level signal) for discriminating the group priority level corresponding to a particular station, at the same timing as that of the *i*-th clock pulse from said start pulse S in said pulse train on said address line, b. means to transmit to said data line an individual-priority-level discriminating pulse order signal for discriminating pulse order signal for discriminating the individual priority level peculiar to said particular station, at the same timing as that of the j-th clock pulse from said end pulse E in said pulse train on said address line, c. discriminator means to discriminate the presence of a prior pulse having a timing earlier than that of said group-priority-level discriminating pulse (level signal) peculiar to said particular station, from among those group-priority-level discriminating pulses (level signals) on said data line which have been transmitted by other stations, and d. means to stop the operation of the transmitter means of said individual-priority-level discriminating pulse in response to a fact that said discriminator means has discriminated the presence of said prior pulse.

5. A system for transmitting information between a central control sector and a plurality of stations connected to said sector through address and data transmission lines, each station of said plurality being assigned a respective priority of access to said central control sector for transmitting data thereto, comprising:

first means, responsive to an access request signal generated by a station among said plurality during a first time period, for supplying said access request signal to said data line; and second means, responsive to the order of priority of each station, for enabling a signal from a station to be supplied to said data line during a second time period only if, during said first period of time, no access request signal has been generated by another station having a higher order of priority.

6. A system according to claim 5, wherein said first means includes means, coupled to said address line, for supplying address signals thereto from said central control sector, so as to permit an access request signal to be supplied from a station to said data line during the period of time during which an address signal corresponding to that station is supplied to said first means.

7. A system according to claim 6, further including means for generating a control signal, to control the operation of said system, said control signal including a starting pulse, a plurality of clock pulses forming said address signal, following said start pulse during said first time period, the occurrence of each clock pulse with respect to said start pulse corresponding to a level of priority of a respective station, and an end pulse, followed by at least one additional pulse occurring during said second period of time, said control signal being supplied to said address signal supplying means from said address line.

8. A system according to claim 7 wherein said first means further includes timing means, responsive to said address signal supplying means, for generating timing signals corresponding to predetermined portions of said control signal.

9. A system according to claim 8, wherein said first means further includes a first gate means responsive to the coincidence of an access request signal and a timing signal from said timing signal generating means corresponding to the address of a station generating said access request signal, for coupling said access request signal to said data line during said first time period.

10. A system according to claim 9, wherein said second means includes a data receiver coupled to said data line for receiving each access request signal generated by any station during said first period of time according to its order of priority and a second gate means, coupled to said data receiver, for coupling a signal from a station to said data line during said second period of time.

11. A system according to claim 10, further including a first flip-flop responsive to an output from a station, for supplying an enabling signal to each of said first and second gate means, and for supplying a disabling signal to each of said first and second gate means in response to a resetting signal, from said timing means, corresponding to the last of said at least one of said additional signal following said end pulse.

12. A system according to claim 11, wherein said second means further includes a second flip-flop having its set and reset inputs connected to said timing means so as to receive therefrom a signal corresponding to said starting pulse and a signal corresponding to a predetermined clock pulse, the output of said second flip-flop being connected to one input of an AND gate, to the other input of which is connected the output of said data receiver, and wherein the output of said AND gate is connected to the set input of a third flip-flop, the reset input of which is connected to said timing means to receive said at least one additional signal following said end pulse, the output of said third flip-flop being connected to said second gate means.

13. A system according to claim 12, further including an OR gate and a driving circuit connected in series to the outputs of said first and second gate means and said data line.

14. A system according to claim 7, wherein said stations are grouped according to levels of priority, each station within a predetermined priority group having an individual address corresponding to said at least one additional pulse occurring during said second period of time.

15. A system according to claim 12, wherein said stations are grouped according to levels of priority, each station with a predetermined priority group having an individual address corresponding to said at least one additional pulse occurring during said second period of time.

* * * * *